US006879716B1

(12) United States Patent
Ishibashi (10) Patent No.: US 6,879,716 B1
(45) Date of Patent: Apr. 12, 2005

(54) METHOD AND APPARATUS FOR COMPRESSING MULTISPECTRAL IMAGES

(75) Inventor: Hideyasu Ishibashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 584 days.

(21) Appl. No.: 09/692,043

(22) Filed: Oct. 20, 2000

(30) Foreign Application Priority Data

Oct. 20, 1999 (JP) .......................................... 11-297895

(51) Int. Cl.[7] .............................. G06K 9/00; G06K 9/36
(52) U.S. Cl. ....................................... 382/166; 382/232
(58) Field of Search ................................ 382/232, 239, 382/248, 173, 167, 162, 166

(56) References Cited

U.S. PATENT DOCUMENTS

| | | | | | |
|---|---|---|---|---|---|
| 5,513,128 | A | * | 4/1996 | Rao | 382/232 |
| 5,793,884 | A | * | 8/1998 | Farrell | 382/167 |
| 6,546,146 | B1 | * | 4/2003 | Hollinger et al. | 382/253 |

OTHER PUBLICATIONS

"Practical Transform Coding of Multispectral Image," John A. Saghri et al, IEEE Signal Processing Magazine, Jan. 1995, pp. 32–43.*

"Information Extraction, SNR Improvement, and Data Compression in Multispectral Imagery," Patrick J. Ready et al, IEEE Transactions on Communications, vol. COM–21, No. 10, Oct. 1973, pp. 1123–1131.*

"Coding of Spectrally Homogeneous Regions in Multispectral Image Compression," Gabriel Fernandez et al. Proceedings of International Conference on Image Processing, 1996, May 16–19, 1992, pp. 923–926.*

Multispectral Color System with an Encoding Format Compatible with the Conventional Tristimulus Model:, (Th. Keusen, Journal of Imaging Science and Technology 40: pp. 510–515, 1996).

Partial translation of "Kagaku Keisoku no tameno Hakei Data Shori (Waveform Data Processing for Scientific Measurement)" (S. Minami, pp. 220–225, CQ Publishing Co., 1986.

* cited by examiner

*Primary Examiner*—Wenpeng Chen
(74) *Attorney, Agent, or Firm*—Sughrue Mion, PLLC (57) ABSTRACT

The multispectral image compressing method segments a multispectral image into a plurality of tile images, performs principal component analysis on the respective tile images to obtain for each tile image a plurality of sets of principal component vectors and principal component images for the multispectral image, determines from the plurality of sets, for each tile image, an optimum principal component number of sets of optimum principal component vectors and the corresponding optimum principal component images that optimally represent the image information about the multispectral image, whereby the image data for the multispectral image is compressed to the optimum principal component number, the optimum principal component images and the optimum principal component vectors for each tile image, as well as the relevant tile image information.

17 Claims, 3 Drawing Sheets

METHOD AND APPARATUS FOR COMPRESSING MULTISPECTRAL IMAGES

BACKGROUND OF THE INVENTION

This invention relates to an image data compressing technology by which image data for a multispectral image reconstructed from a plurality of band images of an object captured in a wavelength range as divided into a plurality of bands can be efficiently compressed without impairing the quality of the image.

With the recent advances in digital image processing, it has become possible to provide a complete representation of image's color information (lightness, hue and saturation) by a multispectral image which carries spectral information for each of its pixels. To produce a multispectral image, an object is recorded in divided wavelength bands and on the basis of a multiband image consisting of the captured band images, the spectral reflectance distribution is estimated for each band image. The multiband image can reproduce the color information that cannot be fully represented by the conventional RGB color images consisting of red (R), green (G) and blue (B) images and will prove effective in the art world which needs more accurate color reproduction. In order to make the most of the capability for correct reproduction of color information, the multispectral image is desirably produced from a multiband image having as many bands as possible, say, 41 bands which are obtained by dividing a recording wavelength range of from 380 to 780 nm by 10 nm or even 81 bands by dividing the range by 5 nm.

A problem with the multispectral image having spectral information for each pixel is that it possesses spectral reflectance data for each group of the channels, say, 41 channels, into which the recording wavelength range has been divided and that compared to the conventional 3-channel RGB color images, the volume of the required image data is about 13 times as much (41/3). This means a large storage capacity and a prolonged time are required to save the image data for multispectral images. In addition, so much time is taken to transfer the image data over a communication network that great difficulty is involved in data handling.

To deal with this situation, Keusen proposed an improved technique in which spectral waveforms obtained from spectral information for each of the pixels in a multispectral image were expanded into three color matching functions as of the RGB colorimetric system and those portions of the spectral waveforms that could not be expressed by color matching functions were expanded into basis vectors by principal component analysis and those principal components which were representative of the image information for the spectral images were extracted and adopted but other principal components were discarded so that the spectral waveforms of interest were eventually expressed by a total of six to eight basis vectors including the color matching functions [Th. Keusen, Multispectral Color System with an Encoding Format Compatible with the Conventional Tristimulus Model, Journal of Imaging Science and Technology 40: 510 to 515, (1996)]. In accordance with this method, the image data for the multispectral image can be compressed by expressing the spectral waveforms in terms of six to eight basis vectors and their multispectral coefficients. In particular, if the spectral waveforms are expressed by the color matching functions of the RGB colorimetric system, their coefficients are R, G and B tristimulus values and the image can be directly sent for subsequent processing without performing any special transformations in order to provide compatibility for the conventional image processing and display apparatus which employ the tristimulus values of R, G and B pixels. This is a great benefit to the purpose of reducing the volume of data processing.

If a multispectral image consisting of 41 spectral images is expressed by eight basis vectors and their multispectral coefficients according to the method described above, the image data to be handled can be compressed to about 20% of the initial volume (8/41×100). Compared to the RGB color image, the volume of the image data for the multispectral image composed of 41 spectral images is about 13 times as much and even if it is reduced to about 30% of the initial value by the Keusen method, the volume is still as much as about 2.5 times the image data for the RGB color image (13×20/100). As a result, the aforementioned problem of the prior art still remains and the time for recording and storing the image data on recording media as well as the time for transferring them over a communication network are long enough to present difficulty in data handling.

SUMMARY OF THE INVENTION

The present invention has been accomplished under these circumstances and has as an object providing a method by which a multispectral image reconstructed from a plurality of spectral images obtained by recording an object in a wavelength range as divided into a plurality of bands can be compressed at an increased ratio but without causing visual deterioration and which thereby improves the efficiency of image data handling.

Another object of the invention is to provide an apparatus for implementing the method.

In order to attain the object descried above, the present invention provides a method of compressing a multispectral image composed of a plurality of spectral images of an object captured in a wavelength range divided into a plurality of bands, comprising the steps of segmenting the multispectral image into a plurality of tile images, performing principal component analysis on respective tile images to obtain for each tile image a principal component number of sets of principal component vectors and principal component images for the multispectral image, determining from the plurality of sets, for each tile image, an optimum principal component number of sets of optimum principal component vectors and corresponding optimum principal component images that optimally represent image information about the multispectral image, and expressing compressed image data for the multispectral image by means of at least the optimum principal component number of sets of optimum principal component images and optimum principal component vectors for each tile image.

Preferably, the compressed image data for the multispectral image are expressed not only by the optimum principal component number of sets of the optimum principal component images and the optimum principal component vectors but also by tile image information having information about tile numbers of the tile images, a tile position and an image size of the tile images.

Preferably, the optimum principal component number is determined based on colorimetric values in a color space.

Preferably, the optimum principal component number is a minimum principal component number at which an absolute value of difference between image information about a composite image that is composed of selected number of sets of the principal component vectors and the principal component images and the image information about an original image that is composed based on the multispectral image is below a specified value or an absolute value of variation in error from the original image which is presented when the composite image is determined by sequentially including in an order of contribution those principal component vectors which make greater contribution to the multispectral image does not exceed a predetermined value.

Preferably, an image size of the tile images in terms of pixel is expressed as a power notation of 2 in both a longitudinal and a transverse direction.

Preferably, the tile images all have an image size in terms of pixel.

In order to attain another object described above, the present invention provides an apparatus for compressing a multispectral image composed of a plurality of spectral images of an object captured in a wavelength range divided into a plurality of bands, comprising an image segmenting section for segmenting the multispectral image into a plurality of tile images, a principal component analyzing section in which respective tile images obtained in the image segmenting section are subjected to principal component analysis to obtain for each tile image a principal component number of sets of principal component vectors and principal component images for the multispectral image, and an optimum principal component vector/image extracting section which determines an optimum principal component number of sets of optimum principal component vectors and optimum principal component images that optimally represent image information about the multispectral image from the principal component number of sets of principal component vectors and principal component images as obtained in the principal component analyzing section, and wherein image data for the multispectral image is compressed by expressing by means of at least the optimum principal component vectors and the image data for the optimum principal images for each tile image as obtained in the optimum component vector/image extracting section.

THE PREFERRED EMBODIMENT OF THE INVENTION

A multispectral image acquisition system for implementing the multispectral image compressing method according to the first aspect of the invention is described below in detail by reference to the preferred embodiment shown in the accompanying drawings.

Figure 1:
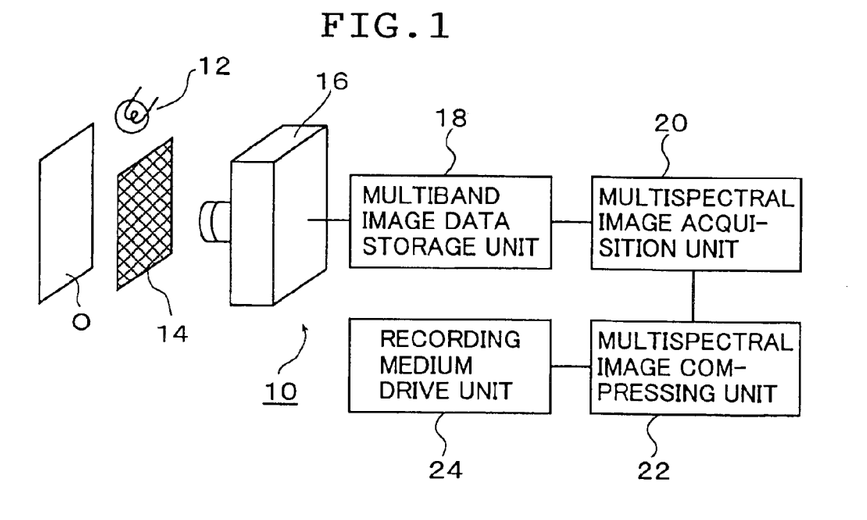
FIG. 1 shows in conceptual form an exemplary multispectral image acquisition system including the multispectral image compressing apparatus according to the second aspect of the invention.

FIG. 1 shows a multispectral image acquisition system for implementing the multispectral image compressing method according to the first aspect of the invention and which includes the multispectral image compressing apparatus according to the second aspect of the invention.

The multispectral image acquisition system (hereunder referred to simply as "the system") which is generally indicated by 10 takes a multispectral image of an object 0 and stores the captured image data on a recording medium. Its principal components are as follows: a light source 12 for illuminating the object 0; a variable filter 14 for dividing the recording wavelength range into a plurality of bands; a CCD camera 16 for taking a multiband image of the object 0; a multiband image storage section 18 for saving the captured image data temporarily; a multispectral image acquisition unit 20 for reconstructing a multispectral image from the multiband image by estimating the spectral reflectance distribution for each pixel; a multispectral image compressing unit 22 for compressing the image data for the multispectral image at a higher ratio while suffering limited visual deterioration; and a recording medium drive unit 24 for saving the compressed image data. In the present invention, the multispectral image has preferably at least six channels of spectral images and, hence, at least six constituent wavelengths in the spectral reflectance distribution.

The light source 12 for illuminating the object 0 is not limited in any particular way as regards type and other factors; however, for the purpose of reconstructing a multispectral image from the captured multiband image by estimating the spectral reflectance distribution, the light source 12 is preferably one with a known spectral intensity distribution.

The variable filter 14 is a bandpass filter with which the recording wavelength range can be divided into a variable number of bands, say, 16, 21, 41 or 81 bands for the purpose of capturing a multiband image of the object 0. A useful example of the variable filter 14 is a liquid-crystal tunable filter.

The CCD camera 16 is a device with which the object 0 imaged by the light reflected from it to pass through the variable filter 14 so that it is segmented into a desired number of spectral wavelength bands is captured as black-and-white band images. The image-receiving plane of this camera has a planar array of CCDs (charge-coupled devices) as area sensors. For proper setting of the dynamic range for the lightness values of the image to be taken, the CCD camera 16 includes a mechanism for adjusting the white balance before taking the picture of the object 0.

The multiband image data storage unit 18 is a site for temporary storage and saving of the multiband image composed of a plurality of band images that have been captured in the recording wavelength range as divided into multiple bands and which have the white balance adjusted in association with the respective bands.

The multispectral image acquisition unit 20 has one-dimensional look-up tables (1D LUTs) constructed preliminarily on the basis of the correspondence between the image data for objects with known values of spectral reflectance that were captured with the CCD camera 16, for example, the image data for the gray patches on a Macbeth chart, and the known values of spectral reflectance. Using the 1D-LUTs and on the basis of the image data for the multiband image of the object 0 that have been retrieved from the multiband image data storage unit 18, the multispectral image acquisition unit 20 estimates the spectral reflectance of the object 0 for each pixel and acquires the multispectral image.

If the variable filter 14 has such filter characteristics that its spectral transmittance distribution partly overlaps between bands, the acquired multispectral image does not have a sharp enough spectral reflectance distribution to assure highly precise estimation of the spectral reflectance distribution of the object 0. To avoid this problem, such filter characteristics may be eliminated by deconvolution through matrix operations and Fourier transformation.

In this way, the multispectral image having an n-wavelength spectral reflectance distribution as spectral information is acquired from the multiband image captured with the aid of the variable filter 14 that divided the recording wavelength range into n bands.

The recording medium drive unit 24 records the image data for the multispectral image on various kinds of recording media such as hard disk, floppy disk, MO, CD-R and DVD after they have been compressed by the multispectral image compressing unit 22 to be described later. In addition to or in place of the recording medium drive unit 24, a network coupler may be installed so that the compressed multispectral image data to be described later can be transferred over a variety of communication networks.

Figure 2:
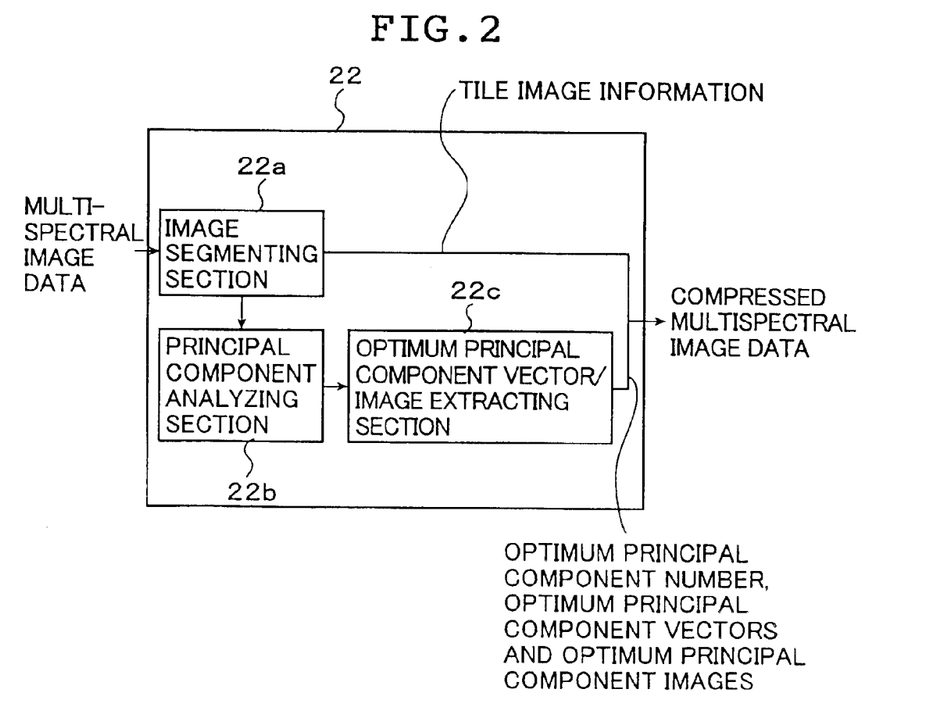
FIG. 2 is a block diagram for an example of the multispectral image compressing apparatus.

The multispectral image compressing unit 22 is a site at which the multispectral image data that constitutes the multispectral image obtained by the multispectral image acquisition unit 20 is compressed at high ratio while suffering only limited visual deterioration. As shown in FIG. 2, the multispectral image compressing unit 22 comprises an image segmenting section 22a, a principal component analyzing section 22b and an optimum principal component vector/image extracting section 22c. If desired, the multispectral image compressing unit 22 may be composed of software having the capabilities set forth below or it may be configured as a single hardware unit.

The image segmenting section 22a is a site where the image obtained by the multispectral image acquisition unit 20 is segmented into $n_t$ the images Ti (L=1 to $n_t$). To give just one example, a multispectral image consisting of 1024× 1024 pixels may be segmented into tile images $T_L$ each consisting of 16×16 pixels. The size of tile images $T_L$ must be such that their total number of the pixels in each tile image $T_L$ is at least greater than the number of constituent wavelengths in the spectral reflectance distribution for each of the pixels in the multispectral image. If this condition is not met, highly precise principal component vectors cannot be determined in a principal component analysis to be discussed below.

Figure 3:
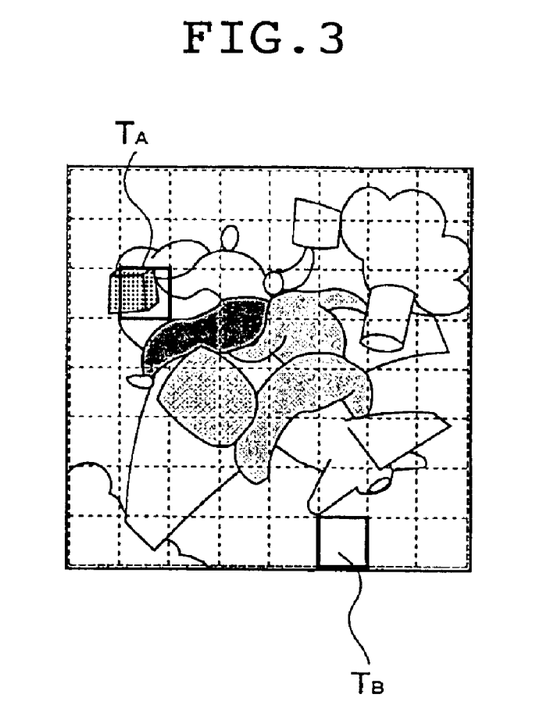
FIG. 3 illustrates how an image is segmented into tile images in the practice of the multispectral image compressing method according to the first aspect of the invention.

FIG. 3 shows am example of segmenting the multispectral image into tile images $T_L$. In the illustrated case, the multispectral image is segmented in eight rows and eight columns to obtain 64 tile images $T_L$ of identical size. Tile images of identical size permit easy processing in the analysis of principal components and the construction of image information that are to be discussed later. Preferably, the longitudinal and transverse sizes of each tile image $T_L$ are such that the number of pixels can be expressed as a power notation of 2. This is in order to provide convenience for retrieving the compressed image data and performing necessary processing.

In the embodiment under discussion, all tile images $T_L$ are of the same size but this is not the sole case of the invention and the size of tile images $T_L$ may be varied as appropriate for the contents of the image. For example, if the background of the image is the sky, the ground or the like that has small changes in hue, lightness or saturation, the size of the tile images $T_L$ in such background may be increased; on the other hand, the tile images $T_L$ in a portion that includes the object and the like which has marked changes in hue, lightness or saturation may have a smaller size. Varying the tile image size contributes to an enhanced compression ratio.

As long as the total number of pixels in each tile image $T_L$ is at least greater than the number of constituent wavelengths, the size of the tile image $T_L$, its aspect ratio and other factors are not limited in any particular way.

The principal component analyzing section 22b is a site where the principal components of the spectral reflectance distribution possessed by each of the pixels in the tile images $T_L$ (L=1 to $n_t$) into which the multispectral image has been segmented are analyzed and the spectral reflectance distribution for each pixel is expanded into principal components. In the following discussion, the number of wavelength bands is assumed to be n.

The principal component analysis to be performed in the present invention is commonly called "optimum sampling" which is one of the methods for sampling a group of observed waveform data by expansion into orthonormalized basis functions. This is a method for providing the most precise representation of the observed waveform data by weighted averaging of the least number of orthogonal basis functions. In the following discussion, the orthogonal basis functions are called "principal component vectors".

A specific procedure for the principal component analysis to be performed in the present invention is this. On the basis of the observed waveform for each of the pixels in the tile images $T_L$ (L=1 to $n_t$) into which the multispectral image has been segmented, linearly independent eigenvectors that are inherent in the observed waveforms are determined as principal component vectors by statistical and eigenvalue analyzing techniques. From the thus determined principal component vectors, those principal component vectors having such small eigenvalues that would be reduced to zero if the observed waveforms had no noise component are eliminated to determine a smaller number of optimum principal component vectors than n, or the number of wavelength bands. The observed waveforms are linearly expressed by these optimum principal component vectors. For details of this method, see "Kagaku Keisoku no tameno Hakei Data Shori (Waveform Data Processing for Scientific Measurement and Instrumentation)", ed. and written by S. Minami, pp. from 220 to 225, CQ Publishing Co., 1986. The principal component analysis is primarily performed in the principal component analyzing section 22b and the optimum principal component vector/image extracting section 22c to be described later.

The principal component analysis is preferably performed in the case where the observed spectral reflectance waveform for each of the pixels in the tile images $T_L$ (L=1 to $n_t$) into which the multispectral image has been segmented can be expressed linearly and where the noise component in that waveform is also independent of the value of spectral reflectance.

We now describe the procedure of principal component analysis with particular reference being made to the embodiment under consideration. For each pixel, the tile images $T_L$ (L=1 to $n_t$) into which the multispectral image has been segmented have the values of spectral reflectance distribution R which are equal in number to n, or the number of bands into which the wavelength for recording the object has been divided by means of the variable filter 14. To be more specific, the tile images $T_L$ have the spectral reflectance distribution R that has n constituent wavelengths corresponding to n bands and which consists of n values of spectral reflectance. In addition, the total number of pixels in the tile images $T_L$ is greater than n, or the number of constituent wavelengths. Hence, by means of a statistical treatment that is independent of the pixel position in the images, namely, by expressing the spectral reflectance distribution $R(i,j,\lambda)$ in the form of an n-dimensional vector, i.e.

$[R(i,j,\lambda_1), R(i,j,\lambda_2), R(i,j,\lambda_j), \ldots, R(i,j,\lambda_n)]^T$ (superscript T represents transposition, (i,j) the position of a pixel of interest, and $\lambda$ the spectral wavelength) and determining an autocorrelation matrix T of this R for all pixels in the tile images $T_L$, principal component analysis of the spectral reflectance can be performed statistically.

The principal components to be determined by principal component analysis are obtained by statistical treatments. To give an example, principal component vectors $p_k(\lambda)$ (k is an integer between 1 and n) which are eigenvectors of an orthonormalized autocorrelation matrix T consisting of n spectral reflectance values corresponding to n bands are determined as a plurality of sets with eigenvalues $u_k$ (k=1 to n) of the autocorrelation matrix T. The principal component vectors $P_k(\lambda)$ (k=1 to n) are used to obtain a linear expansion of the spectral reflectance distribution $R(i,j,\lambda)$ for the tile images $T_L$ at pixel position (i,j), as well as to determine the coefficients $s_k(i,j)$ (k=1 to n) for the respective principal component vectors $P_k(\lambda)$ (k=1 to n); thereafter, principal component images $S_k$ (k=1 to n) are obtained that use those coefficients as image data at the pixel position (i,j).

Principal component analysis is performed on the respective tile images $T_L$ (L=1 to $n_t$) and the principal component vectors $p_k(\lambda)$ (k=1 to n) and the principal component images $S_k$ (k=1 to n) that have been obtained for each tile image $T_L$ (L=1 to $n_t$) are sent to the optimum principal component vector/image extracting section 22c.

In the optimum principal component vector/image extracting section 22c the principal component vectors $p_k(\lambda)$ (k=1 to n) that have been obtained for each tile image $T_L$ (L=1 to $n_t$) in the principal component analyzing section 22b and the corresponding principal component images $S_k$ (k=1 to n) also obtained in 22b are used to determine an optimum principal component number $m_1$ for each tile image $T_L$ (L=1 to $n_t$) which is used to extract optimum principal component vectors $p_k(\lambda)$ (k=1 to $m_1$) and optimum principal component images $S_k$ (k=1 to $m_1$) for each tile image $T_L$ (L=1 to $n_t$).

To be more specific, from the sets of the n principal component vectors $p_k(\lambda)$ (k=1 to n) for the tile images $T_L$ and the corresponding principal component images $S_k$ (k=1 to n), the sets of m (m<n) principal component vectors $p_k(\lambda)$ (k=1 to m) and the corresponding principal component images $S_k$ (k=1 to m) are chosen and used to determine a composite image. The error in image information that may be possessed by this composite image as compared with the original tile images $T_L$ is used to determine whether the m principal component vectors $p_k(\lambda)$ (k=1 to m) and the corresponding principal component images $S_k$ (k=1 to m) are really optimum principal components.

The principal component vectors $p_k(\lambda)$ for the tile images $T_L$ are such that the greater the corresponding eigenvalue $u_k$, the greater the contribution the principal component makes to the spectral reflectance distribution of each tile image $T_L$. Considering this fact, the principal component vectors $p_k(\lambda)$ are lined up in the decreasing order of eigenvalue $u_k$ and composite images are reconstructed under a given illuminating light source by adopting an increasing number of principal component vectors having the larger eigenvalues $u_k$. In this process, the error in image information the composite image has with respect to the original tile images $T_L$ each composed of n principal component vectors decreases monotonically with the increase in m, or the number of the principal component vectors to be adopted. Therefore, the principal component vector number m at which the above-mentioned error first decreases below a predetermined value can be taken as a minimum optimum principal component number $m_1$. As a result, the principal component vectors adopted to determine a composite image with the optimum principal component number $m_1$ and the principal component images obtained on the basis of these vectors can respectively be extracted as optimum principal component vectors $p_k(\lambda)$ (k=1 to $m_1$) and optimum principal component images $S_k$ (k=1 to $m_1$) for the tile images $T_L$. Such optimum principal component vector $p_k(\lambda)$ (k=1 to $m_1$) and optimum principal component image $S_k$ (k=1 to $m_1$) are determined for each tile image $T_L$.

The term "image information" as used herein means colorimetric values L*, a* and b* as measured in the CIEL*a*b* color space under a given light source such as the CIED$_{65}$ standard illuminant, and the "error" in such image information is the color difference $\Delta E_0$ expressed by the following equation (1). The optimum principal component $m_1$ can be determined by finding the principal component image number m at which the color difference $\Delta E_0$ is below a predetermined value, say, 1.0:

$$\Delta E_0 = \{(\Delta L^*)^2 + (\Delta a^*)^2 + (\Delta b^*)^2\}^{1/2} \qquad (1)$$

where $\Delta L^*$, $\Delta a^*$ and $\Delta b^*$ represent the differences the composite image has with respect to the tile images $T_L$ in terms of the average colorimetric values L*, a* and b* measured for all or part of the image. Thus, the optimum principal component number $m_1$ is adaptively determined on the basis of the color differences $\Delta E_0$ between the colorimetric values of the composite image in a color space and those of the original image.

The error in the image information may be the square error $E_1$ from the original image of the spectra for the pixels in all or part of the tile images of the composite image reconstructed by the m principal component vectors $p_k$. The image data for the spectra having spectral information in correspondence with the bands of the composite image can also be regarded as an example of colorimetric values and the optimum principal component number $m_1$ may be adaptively determined on the basis of the square error $E_1$ between the spectral image data that are the colorimetric values of the composite image in a color space and the spectral image data which are the colorimetric values of the original image. Since the square error $E_1$ or $\log(E_1)$ decreases monotonically with the principal component vector number m, the optimum principal component number $m_1$ may be determined by increasing m and finding the value of m at which the amount of decrease in the square error $E_1$ or $\log(E_1)$ becomes smaller than a predetermined value, or a minimum value of m at which the decrease in the square error E with increasing m is saturated below a predetermined value may be substituted.

The obtained tile information consists of the optimum principal component number $m_1$, optimum principal component vectors $p_k(\lambda)$ (k=1 to $m_1$) and the image data for the optimum principal component images $S_k$ (k=1 to $m_1$) is sent to the recording medium drive unit 24 as compressed multispectral image data together with the tile image information that was constructed when the multispectral image was segmented into tile images $T_1$ in the image segmenting section 22a and which consists of the tile number of each tile image $T_L$, the tile position on the multispectral image, tile size (image size) of each tile image $T_L$ and the pointer (address) for the tile information.

Having described the configuration of the system 10, we next describe the sequence of steps in the method of the invention for compressing multispectral images by the system 10. The reader of the following description should refer to FIG. 4 for better understanding of the invention.

Figure 4:
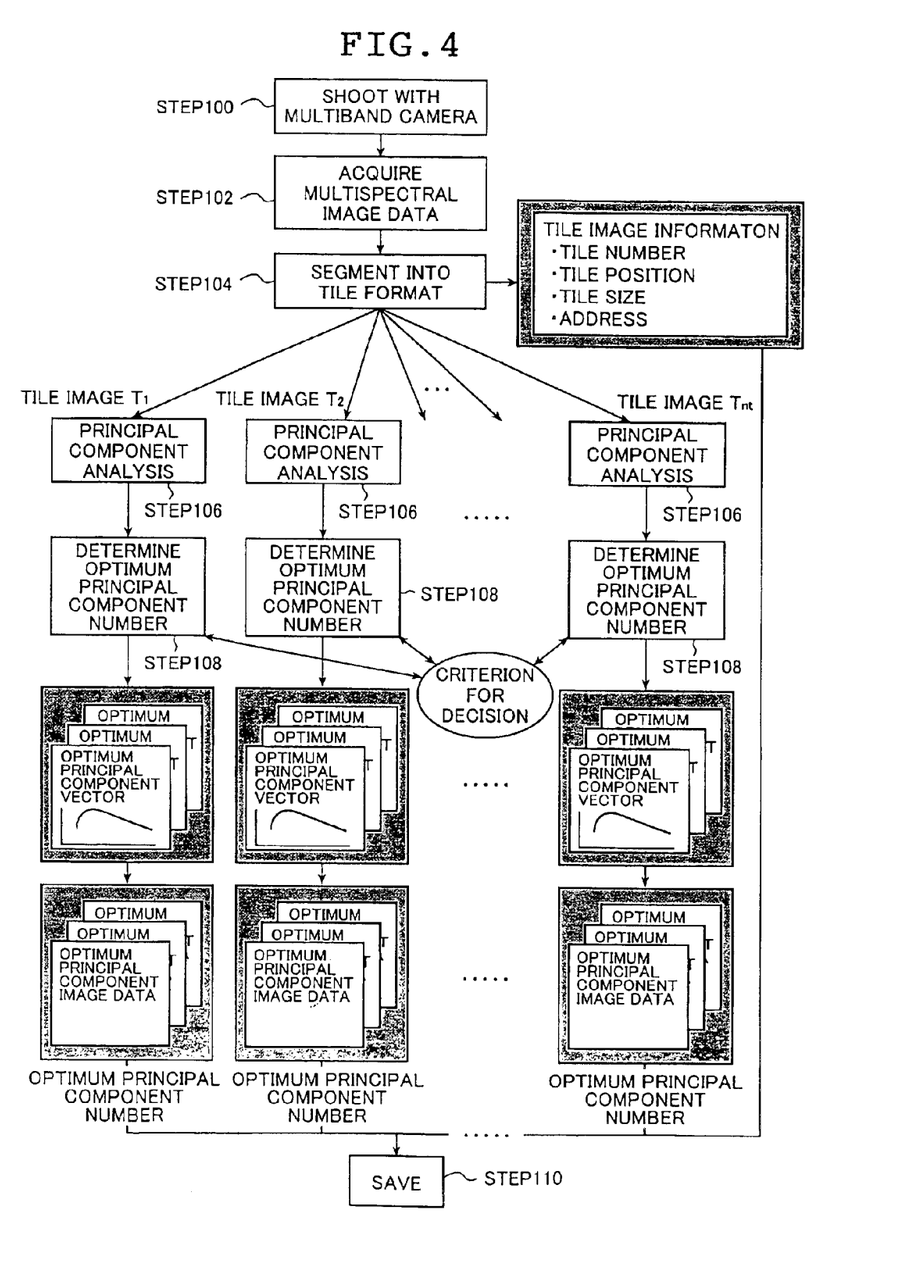
FIG. 4 is a flowchart for an example of the multispectral image compressing method.

First, the object 0 is recorded with a multiband camera consisting of the light source 12, variable filter 14 and CCD camera 16 to acquire a multiband image which consists of a plurality of band images corresponding to the n bands into which the recording wavelength range has been divided (step 100). The acquired multiband image is temporarily stored in the multiband image data storage unit 18 and then sent to the multispectral image acquisition unit 20.

The multispectral image acquisition unit 20 has one-dimensional look-up tables (1D-LUTs) typically constructed from the correspondence between the image data for gray patches on a Macbeth chart and the values of their spectral reflectance. Using these 1D-LUTs as well as the image data for the multiband image of the object 0 that has been retrieved from the multiband image data storage unit 18, the unit 20 estimates the pixel-based spectral sensitivities of the object 0 and acquires the image data for the multispectral image (step 102). To estimate a highly precise spectral reflectance distribution for the object 0, deconvolution may optionally be performed by matrix operations and Fourier transformation.

In the next step 104, the image data for the multispectral image is segmented in a tile format to produce tile images $T_L$ (L=1 to $n_t$). At the same time, tile image information as header information is constructed and this information comprises the tile number of each tile image $T_L$, the tile position on the multispectral image, the tile size (image size) of each tile image $T_L$ and the pointer (address) for the tile information (to be described later) which consists of the optimum principal component number $m_1$, optimum principal component vectors $p_k(\lambda)$ and the image data for the optimum principal component images $S_k$.

As FIG. 3 shows, all tile images $T_L$ (L=1 to $n_t$) have identical image size from the viewpoint of easy processing. If desired, in order to increase the compression ratio, the size of the tile images $M_L$ may be varied as appropriate for the contents of the original image.

In the next step 106, principal component analysis is performed for each of the tile images $T_L$ (L=1 to $n_t$) in order to determine principal component images $S_k$ (k=1 to n) and principal component vectors $p_k(\lambda)$ (k=1 to n). The process of this principal component analysis is described below.

At the pixel position (i,j), each tile image $T_L$ has a spectral reflectance distribution having n spectral reflectance values. If this spectral reflectance distribution is written as $R(i,j,\lambda) = [R(i,j,\lambda_1), R(i,j,\lambda_2), R(i,j,\lambda_3), \ldots, R(i,j,\lambda_n)]^T$ (superscript T represents transposition), calculation is made to determine an autocorrelation matrix T ($T_{i,j}$, or (i,j) component of T, is $R^T \cdot R/n$) for all pixels in the image or part of them, for example, the pixels that are left intact after pixel elimination at given intervals.

It is possible to determine the (i,j) component of the T matrix using the spectral reflectance distribution $R(i,j,\lambda)$ (column vector or matrix with n rows and one column, namely a column matrix). In this operation, the spectral reflectance distribution $R(i,j,\lambda)$ can be expressed by the following formula:

$$R(i, j, \lambda) = (R(i, j, \lambda_1), R(i, j, \lambda_2), \ldots, R(i, j, \lambda_n))^T$$

$$= \begin{pmatrix} R(i, j, \lambda_1) \\ R(i, j, \lambda_2) \\ \ldots \\ R(i, j, \lambda_n) \end{pmatrix}$$

where $R(i, j,\lambda_1)$ denotes a scalar and the superscript "$\tau$" denotes transpose.

Therefore, the (ij) component of the $\tau$ matrix can be expressed by the following equation:

$$T(i, j) = R(i, j, \lambda)^T R(i, j, \lambda)/n$$

$$= 1/n (R(i, j, \lambda_1), R(i, j, \lambda_2), \ldots, R(i, j, \lambda_n)) \begin{pmatrix} R(i, j, \lambda_1) \\ R(i, j, \lambda_2) \\ \vdots \\ R(i, j, \lambda_n) \end{pmatrix}$$

$$= (R(i, j, \lambda_1)^2 + R(i, j, \lambda_2)^2 +, \ldots, R(i, j, \lambda_n)^2)/n$$

The thus obtained autocorrelation matrix $\tau$ is a square (n×n) matrix and can be used to determine eigenvalues $u_k$ ($u_1 > u_2 > \ldots > u_n$, k=1 to n) and principal component vectors $p_k(\lambda)$ that satisfy the following equation (2). The principal component vectors $p_k(\lambda)$ are orthonormalized eigenvectors and expressed by $[p_x(i,j,\lambda_1), p_k(i,j,\lambda_2), p_k(i,j,\lambda_3), \ldots, p_k(i,j,\lambda_n)]^\tau$ (k=1 to n). Methods for determining eigenvalues and eigenvectors are not limited to any particular types and various known methods may be employed, as exemplified by the Jacobi method and the power method.

$$T \cdot p_k(\lambda) = u_k p_k(\lambda) \qquad (2)$$

As the following equation (3) shows, the spectral reflectance distribution $R(i,j,\lambda)$ at pixel position (i,j) is expressed by principal component vectors $p_k(\lambda)$ (k=1 to n) which are eigenvectors:

$$R(i, j, \lambda) = \sum_{k=1}^{n} s_k(i, j) p_k(\lambda) \qquad (3)$$

Since principal component vectors $p_k(\lambda)$ (k=1 to n) are orthonormal to each other, $s_k(i,j)$ can be determined from the following equation (4):

$$\text{i } s_k(i,j) = R(i,j,\lambda) \cdot p_k(\lambda) \qquad (4)$$

where the dot represents the inner product of n-component vectors for the value of band's spectral reflectance, and $s_k(i,j)$ is the quantity representing the magnitude of the kth principal component vector $p_k$ contained in the spectral reflectance $R(i,j,\lambda)$ of the multispectral image at pixel position (i,j). The value of $s_k(i,j)$ is calculated at each pixel position and the kth principal component image $S_k$ (k=1 to n) is then determined that has the calculated values of $s_k(i,j)$ as the image data at the respective pixel positions.

As already mentioned, the contribution made by the first to nth principal components in the spectral reflectance distribution $R(i,j,\lambda)$ decreases with decreasing eigenvalue u, that accompanies each principal component. Hence, to the extent that it holds the image information in an optimum manner, the spectral reflectance distribution $R(i,j,\lambda)$ can be approximated without the principal component vectors p, having smaller eigenvalues $u_k$.

This method of approximation is expressed by the following equation (5); the eigenvalues $u_k$ (k=1 to n) are lined up in decreasing order and the eigenvectors $p_k(\lambda)$ (k=1 to m) which correspond to the first m eigenvalues $u_k$ (k=1 to m) are adopted but the eigenvectors $p_k(\lambda)$ (k=m+1 to n) of the smaller eigenvalues are neglected; in this way, the spectral reflectance distribution $R(i,j,\lambda)$ is approximated and the image data is compressed accordingly:

$$R(i, j, \lambda) \approx \sum_{k=1}^{m} s_k(i, j) p_k(\lambda) \quad (5)$$

Based on this theory, the optimum principal component number $m_1$, or the number of principal component vectors $p_k$ to be adopted that can approximate the spectral reflectance distribution $R(i,j,\lambda)$ without compromising the optimally held image information, is identified and used to compress the tile images $T_L$. As a result, the image data can be compressed without deteriorating the quality of the multispectral image.

In other words, the optimum principal component number $m_1$ which serves as a threshold for adopting the principal component vectors $p_k(\lambda)$ (k=1 to $m_1$) which are eigenvectors of greater eigenvalues $u_k$ but neglecting the eigenvectors $p_k(\lambda)$ (k=$m_2$+1 to n) having smaller eigenvalues and this is set by the following criterion for decision (step 108).

First, substitute the principal component vectors $p_k(\lambda)$ into Eq. (4) in the decreasing order of eigenvalue $u_k$ and determine an approximate spectral reflectance distribution $R'(i,j,\lambda)$ which corresponds to the multispectral image, as expressed by the following equation (6):

$$R'(i, j, \lambda) = \sum_{k=1}^{m} s_k(i, j) p_k(\lambda) \quad (6)$$

The approximate spectral reflectance distribution $R'(i,j,\lambda)$ is not exactly the same as the spectral reflectance distribution $R(i,j,\lambda)$ and contains some error. However, if this approximate spectral reflectance distribution $R'(i,j,\lambda)$ is multiplied by a specified spectral intensity distribution to provide image information about the composite image, the error presented by this image information with respect to the image information for the original image that is obtained by multiplying the tile images $T_L$ by the specified spectral intensity distribution decreases with the increasing principal component number m. Considering this fact, a specified value is preliminarily set as the criterion for decision and the minimum optimum principal component number $m_1$ is acquired by determining the principal component number m at which the error between the image information about the composite image as obtained by multiplying the approximate spectral reflectance distribution $R'(i,j,\lambda)$ by a certain spectral intensity distribution and the image information about the original image first becomes smaller than the specified value which is set as the criterion for decision.

To give an example, the color differences $\Delta E_0$ of colorimetric values L*, a* and b* in the CIE L*a*b* color space under the CIE $D_{65}$ standard illuminant are taken as the error between the image information about the composite image and that about the multispectral image and a specified value is set for each of these color differences $\Delta E$, and the minimum optimum principal component number $m_1$ is determined.

The error may be the square error $E_1$ of the spectra for all or part of the composite image. In this case, one may determine a minimum value of the optimum principal component number $m_1$ at which the decrease in the square error $E_1$ with increasing principal component number m is saturated below a predetermined value.

Thus determined is the minimum optimum principal component number $m_1$ which holds and optimally represents the image information about each of the tile images $T_L$ and based on this number, one acquires $m_1$ optimum principal component vectors $p_k(\lambda)$ (k=1 to m) corresponding to eigenvalues $u_1$ to $u_{m1}$ ($u_1$ to $u_{m1} > u_{m1+1} > \ldots > u_n$), as well as $m_1$ optimal principal component images $S_k$ (k=1 to $m_1$). In comparatively many cases, the rejected principal component vectors $p_k(\lambda)$ (k=$m_1$+1 to n) are predominantly composed of the noise component in the tile images $T_L$ and, hence, the noise component in the multispectral image can be suppressed by rejecting the less contributing principal component vectors $p_k(\lambda)$ (k=$m_1$+1 to n) from the tile images $T_L$.

Thus, in step 108, the optimum principal component number, optimum principal component vectors $p_k(\lambda)$ and the image data for the optimum principal component images $S_k$ are obtained for each of the tile images $T_L$ (L=1 to $n_t$) and together with the tile image information constructed in step 104, this tile information is sent to the recording medium drive unit 24 where they are recorded and stored on a recording medium such as hard disk, floppy disk, MO, CD-R or DVD (step 110). In the embodiment under consideration, the multispectral image is segmented into tile images $T_L$ and principal component analysis is performed for each tile image $T_L$ and this offers a particular advantage in that if the tile images $T_L$ do not change greatly in hue, lightness or saturation, the optimum principal component number $m_1$ suffices to be 1 or 2 and this means that only one or two optimum principal component vectors $P_k$ are necessary to hold and optimally represent the image information. As a result, the image data for the multispectral image can be compressed at a higher ratio without sacrificing the quality of the image.

After determining the optimum principal component number $m_1$ and acquiring both the optimum principal component vectors $p_k(\lambda)$ (k=1 to $m_1$) and the optimum principal component images $S_k$ (k=1 to $m_1$) in step 108, the optimum principal component images $S_k$ (k=1 to $m_1$) may optionally be subjected to further image compression by a suitable technique such as the JPEG (Joint Photographic Experts Group) technique, or compressed to an even higher ratio by huffman coding or any other known arithmetic coding techniques.

Using the above-described multispectral image compressing method and apparatus, the present inventors made an experiment of multispectral image compression in the following manner.

CA-D4-1024A of DALSA (1024×1024 pics each sized to 12×12 microns; furnished with PCI interface; monochromatic) was used as CCD camera 16, and Varispec Tunable Filter (liquid-crystal tunable filter of CRI) as variable filter 14. By means of this apparatus, the recording wavelength range of from 380 to 780 nm was divided by 10 nm into 41 bands (n=41). The object 0 was a person standing outdoors who was recorded with the CCD camera 16 to take a multiband image of the person consisting of 41 band images.

The multiband image storage section 18, multispectral image acquisition unit 20 and multispectral image compressing unit 22 were implemented in a notebook PC (personal computer) of PROSIDE and processing with software was executed on Windows 95 in C++. The CPU in the PC ran at 166 MHz and the RAM had a capacity of 128 Mbytes.

To provide convenience in processing with software, the image data quantization number was changed from 2 bytes to 1 byte in a preliminary treatment, which was not included in the process of compressing the volume of image data to be described below.

First, a multispectral image having 41 constituent wavelength bands was extracted from the multiband image that had been sent to the multispectral image acquisition unit 20.

The extracted multispectral image consisting of 1024×1024 pixels was segmented into tile images $T_L$ (L=1 to 4096) each consisting of 16×16 pixels.

Principal component analysis was performed each of the tile images $T_L$ (L=1 to 4096) to determine principal component vectors $P_k(\lambda)$ (k=1 to 41) and principal component images $S_k$ (k=1 to 41).

Then, in order to determine the optimum principal component number $m_1$, a value of 1.5 in terms of the average color difference based on chromaticity in the CIE D1976 L*a*b* color space under the CIE $D_{65}$ standard illuminant was chosen as the criterion for decision. In the decreasing order of eigenvalues $u_k$ obtained by the principal component analysis, the m corresponding principal component vectors $p_k(\lambda)$ (k=1 to m) were sequentially adopted. After reconstructing a composite image on the basis of these principal component vectors $p_k$, the above-defined average color difference from the original image composed of the tile images $T_L$ was determined and an optimum principal component $m_1$ was also determined at which the average color difference was below 1.5.

As it turned out, the optimum principal component number $m_1$ for the tile images $T_L$ (L=1 to 4096) was between 2 and 6. In the case of the tile image $T_B$ shown in FIG. 3 which is in a blank area that has small changes in hue, lightness and saturation and which is part of the background of the human object 0 or in the case of a tile image $T_L$ having identical hue, lightness and saturation, the optimum principal component number $m_1$ was smaller than in the case of the tile image $T_A$ also shown in FIG. 3 and a value of 2 was sufficient; in other words, the tile images $T_L$ could be expressed by the first principal component vector $p_1(\lambda)$ and the second principal component vector $p_2(\lambda)$. When a less stringent criterion was used, the first principal component vector $p_k(\lambda)$ was sufficient to hold and represent the original image information in an optimal way.

In the next step, tile image information is added to the optimum principal component number $m_1$, optimum principal component vectors $p_k(\lambda)$ and optimum principal component images $S_k$ for each tile image $T_L$ and the tile image information consists of the tile number of tile image $T_L$, the tile position on the multispectral image, the tile size (image size) of tile image $T_L$ and the pointer (address) for the tile information consisting of said optimum principal component number $m_1$, optimum principal component vectors $p_k(\lambda)$ and the image data for the optimum principal component images $S_k$. The combined data is recorded and stored via the recording medium drive unit 24.

As a result, the image data was reduced from about 41 Mbytes to 4 Mbytes, which was less than a tenth of the initial volume. The compressed image data was later retrieved and a composite image was reconstructed but no visual deterioration in image quality was observed.

Obviously, it is clear that the image compressing method according to the first aspect of the invention and the image compressing apparatus using it can compress a plurality of spectral images at a higher ratio, say, about 10:1 without causing any visual deterioration and thus contribute to more efficient handling of image data.

While the multispectral image compressing method and apparatus of the invention have been described above in detail, it should be noted that the foregoing embodiment is not the sole case of the invention and various improvements and modifications are possible without departing from the scope and spirit of the invention.

As described above in detail, according to the present invention, a multispectral image of high data volume is segmented into a plurality of tile images, principal component analysis is performed for each of the tile images and optimum principal component vectors and images that hold and represent the image information in an optimum way are determined for each tile image and this enables the image data compression ratio to be increased without damaging the image quality, thereby contributing to a higher efficiency in the handling of image data.

As a further advantage, the principal component vectors in the multispectral image can be freed of those portions in which the noise component is predominant and this enables suppression of the noise component.

What is claimed is:

1. A method of compressing a multispectral image composed of a plurality of spectral images of an object captured in a wavelength range divided into a plurality of bands, comprising the steps of:

segmenting said multispectral image into a plurality of tile images;

performing principal component analysis on respective tile images to obtain for each tile image a principal component number of sets of principal component vectors and principal component images for the multispectral image;

determining from said plurality of sets, for each tile image, an optimum principal component number of sets of optimum principal component vectors and corresponding optimum principal component images that optimally represent image information about the multispectral image; and expressing compressed image data for said multispectral image by means of at least said optimum principal component number of sets of optimum principal component images and optimum principal component vectors for each tile image, wherein the compressed image data for said multispectral image are expressed not only by said optimum principal component number of set of said optimum principal component images and said optimum principal component vectors but also by tile image information having information about tile numbers of said tile images, a tile position and an image size of said tile images.

2. The method according to claim 1, wherein said optimum principal component number is determined based on colorimetric values in a color space.

3. The method according to claim 1, wherein said optimum principal component number is a minimum principal component number at which an absolute value of difference between image information about a composite image that is composed of selected number of sets of said principal component vectors and said principal component images and the image information about an original image that is composed based on said multispectral image is below a specified value or an absolute value of variation in error from said original image which is presented when said composite image is determined by sequentially including in an order of contribution those principal component vectors which make greater contribution to said multispectral image does not exceed a predetermined value.

4. The method according to claim 1, wherein an image size of said tile images in terms of pixel is expressed as a power notation of 2 in both a longitudinal and a transverse direction.

5. The method according to claim 1, wherein said rile images all have an image size in terms of pixel.

6. An apparatus for compressing a multispectral image composed of a plurality of spectral images of an object captured in a wavelength range divided into a plurality of bands, comprising:

an image segmenting section for segmenting said multispectral image into a plurality of tile images;

a principal component analyzing section in which respective tile images obtained in the image segmenting section are subjected to principal component analysis to obtain for each tile image a principal component number of sets of principal component vectors and principal component images for the multispectral image;

an optimum principal component vector/image extracting section which determines an optimum principal component number of sets of optimum principal component vectors and optimum principal component images that optimally represent image information about the multispectral image from said principal component number of sets of principal component vectors and principal component images as obtained in the principal component analyzing section; wherein image data for said multispectral image is compressed by expressing by means of at least the optimum principal component vectors and the image data for the optimum principal images for each tile image as obtained in said optimum component vector/image extracting section; and wherein a size of each tile image varies in accordance with at least one of hue, lightness and saturation of the multispectral image at a position of the image tile.

7. The apparatus according to claim 6, wherein the tile images comprise spatial segmentation of the multispectral image to form multiple spatially adjacent image segments.

8. A method of compressing a multispectral image composed of a plurality of spectral images of an object captured in a wavelength range divided into a plurality of bands, comprising the steps of:

segmenting said multispectral image into a plurality of tile images;

performing principal component analysis on respective tile images to obtain for each tile image a principal component number of sets of principal component vectors, said principal component number of sets of principal component vectors represented by n;

determining from said principal component number of sets, for each tile image, an optimum principal component number of sets of optimum principal component vectors, said optimum principal component number of sets of optimum principal component vectors represented by m; and expressing compressed image data for said multispectral image by means of at least said optimum principal component number of sets of optimum principal component images and optimum principal component vectors for each the image;

wherein m is determined based on a predetermined value.

9. The method of claim 8, further wherein m<n.

10. An apparatus for compressing a multispectral image composed of a plurality of spectral images of an object captured in a wavelength range divided into a plurality of bands, comprising:

a segmenting unit for segmenting said multispectral image into a plurality of file images;

a principal component analysis unit for performing principal component analysis on respective tile images to obtain for each the image a principal component number of sets of principal component vectors, said principal component number of sets of principal component vectors represented by n;

a determination unit for determining from said principal component number of sets, for each tile image, an optimum principal component number of sets of optimum principal component vectors, said optimum principal component number of sets of optimum principal component vectors represented by m; and a compression expression unit for expressing compressed image data for said multispectral image by means of at least said optimum principal component number of sets of optimum principal component images and optimum principal component vectors for each tile image; wherein m is determined based on a predetermined value.

11. The apparatus of claim 10, further wherein m<n.

12. A method of compressing a multispectral image composed of a plurality of spectral images of an object captured in a wavelength range divided into a plurality of bands, comprising the steps of:

segmenting said multispectral image into a plurality of tile images;

performing principal component analysis on respective tile images to obtain for each tile image a principal component number of sets of principal component vectors and principal component images for the multispectral image;

determining from said plurality of sets, for each tile image, an optimum principal component number of set of optimum principal component vectors and corresponding optimum principal component images that optimally represent image information about the multispectral image; and expressing compressed image data for said multispectral image by means of at least said optimum principal component number of sets of optimum principal component images and optimum principal component vectors for each tile image; wherein said optimum principal component number is a minimum principal component number at which an absolute value of difference between image information about a composite image that is composed of selected number of sets of said principal component vectors and said principal component images and the image information about an original image that is composed based on said multispectral image is below a specified value or an absolute value of variation in error from said original image which is presented when said composite image is determined by sequentially including in an order of contribution those principal component vectors which make greater contribution to said multispectral image does not exceed a predetermined value.

13. The method according to claim 12, wherein said optimum principal component number is determined based on colorimetric values in a color space.

14. The method according to claim 12, wherein an image size of said tile images in terms of pixel is expressed as a power notation of 2 in both a longitudinal and a transverse direction.

15. The method according to claim 12, wherein said tile images all have an image size in terms of pixel.

16. An apparatus for compressing a multispectral image composed of a plurality of spectral images of an object captured in a wavelength fangs divided into a plurality of bands, comprising:

an image segmenting section for segmenting said multispectral image into a plurality of tile images;

a principal component analyzing section in which respective tile images obtained in the image segmenting section are subjected to principal component analysis to obtain for each tile image a principal component number of sets of principal component vectors and principal component images for the multispectral image; and an optimum principal component vector/image extracting section which determines an optimum principal component number of sets of optimum principal component vectors and optimum principal component images that optimally represent image information about the multispectral image from said principal component number of sets of principal component vectors and principal component images as obtained in the principal component analyzing section; and wherein image data for said multispectral image is compressed by expressing by means of at least the optimum principal component vectors and the image data for the optimum principal images for each tile image as obtained in said optimum component vector/image extracting section; and wherein the compressed image data for said multispectral image are expressed not only by said optimum principal component number of sets of said optimum principal component images and sold optimum principal component vectors but also by tile image information having information about tile numbers of said tile images, a tile position and an image size of said tile images.

17. An apparatus for compressing a multispectral image composed of a plurality of spectral images of an object captured in a wavelength range divided into a plurality of bands, comprising:

an image segmenting section for segmenting said multispectral image into a plurality of tile images;

a principal component analyzing section in which respective tile images obtained in the image segmenting section ate subjected to principal component analysis to obtain for each tile image a principal component number of sets of principal component vectors and principal component images for the multispectral image; and an optimum principal component vector/image extracting section which determines an optimum principal component number of sets of optimum principal component vectors and optimum principal component images that optimally represent image information about the multispectral image from said principal component number of sets of principal component vectors and principal component images as obtained in the principal component analysing section, and wherein image data for said multispectral image is compressed by expressing by means of at least the optimum principal component vectors and the image data for the optimum principal images for each tile image as obtained in said optimum component vector/image extracting section; and wherein said optimum principal component number is a minimum principal component number at which an absolute value of difference between image information about a composite image that is composed of selected number of sets of said principal component vectors and said principal component images and the image information about an original image that is composed based on said multispectral image is below a specific value or an absolute value of variation in error from said original image which is presented when said composite image is determined by sequentially including in an order of contribution those principal component vectors which make greater contribution to said multispectral image does not exceed a predetermined value.

* * * * *